United States Patent [19]

Mizukoshi

[11] Patent Number: 5,373,446
[45] Date of Patent: Dec. 13, 1994

[54] VEHICLE GROUND-SPEED DETECTING APPARATUS

[75] Inventor: Masashi Mizukoshi, Susono, Japan

[73] Assignee: Toyota Jidosha Kabushiki Kaisha, Aichi, Japan

[21] Appl. No.: 942,776

[22] Filed: Sep. 10, 1992

[30] Foreign Application Priority Data

Sep. 20, 1991 [JP] Japan .................. 3-270093
Sep. 20, 1991 [JP] Japan .................. 3-270094
Apr. 21, 1992 [JP] Japan .................. 4-128086

[51] Int. Cl.$^5$ .............................................. B60T 8/74
[52] U.S. Cl. ..................... 364/426.01; 364/424.01; 303/95; 303/97
[58] Field of Search ............... 364/565, 566, 426.01, 364/426.02, 426.03, 424.01, 426.04, 550; 303/95, 94, 96, 97

[56] References Cited

U.S. PATENT DOCUMENTS 4,969,100  11/1990  Takata et al. .................. 364/565
5,185,702   2/1993  Okubo ............................ 364/426.02

FOREIGN PATENT DOCUMENTS

395000A2  10/1990  European Pat. Off. .
3426663A1  1/1985  Germany .
3919293A1  12/1989  Germany .
3923782A1   1/1990  Germany .
3924422A1   2/1990  Germany .
3917976A1  12/1990  Germany .
63-46961    2/1988  Japan .

Primary Examiner—Emanuel T. Voeltz
Assistant Examiner—Edward J. Pipala
Attorney, Agent, or Firm—Oliff & Berridge

[57] ABSTRACT

A vehicle ground-speed detecting apparatus, including a vehicle ground-speed sensor for detecting a ground-speed of a vehicle that is a speed of the vehicle relative to a road surface on which the vehicle is running, and generating an output signal representative of the detected vehicle ground-speed, and a proper vehicle ground-speed determining device for obtaining as sampling vehicle ground-speeds successive values of the vehicle ground-speed represented by the output signal from the vehicle ground-speed sensor, and determining a current one of the sampling vehicle ground-speeds as a current proper vehicle ground-speed when the current sampling vehicle ground-speed falls within a current permission range based on a current estimated vehicle ground-speed, the proper vehicle ground-speed determining device determining the current proper vehicle ground-speed by correcting the current sampling vehicle ground-speed when the current sampling vehicle ground-speed does not fall within the current permission range.

23 Claims, 9 Drawing Sheets

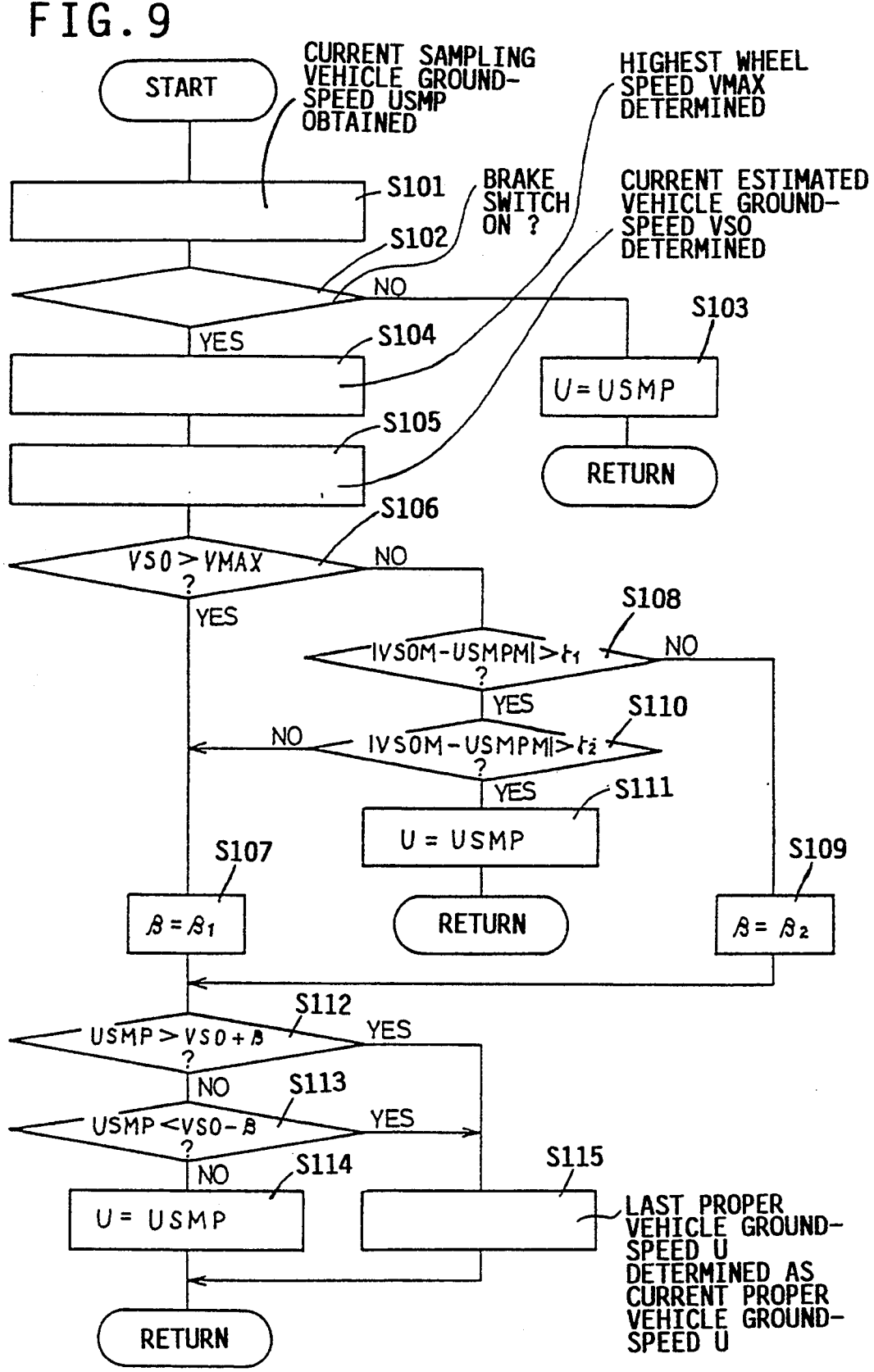

VEHICLE GROUND-SPEED DETECTING APPARATUS

BACKGROUND OF THE INVENTION

1. Field of the Invention

The present invention relates to a vehicle ground-speed detecting apparatus.

2. Related Art Statement

There is known a vehicle ground-speed sensor which detects a ground-speed of a vehicle, that is, a speed of the vehicle relative to a road surface on which the vehicle is running, and which generates an output signal representative of the detected vehicle ground-speed. An example of the sensor is disclosed in the unexamined Japanese Patent Application laid-open under Publication No. 63(1988)-46961. The sensor is of the Doppler-effect type in which the vehicle ground-speed is detected by utilizing the Doppler effect of a wave, or of the spatial-filter type in which the vehicle ground-speed is detected by a spatial filter which detects the surface pattern (surface unevenness) of an asphalt road, a sandy road, etc.

It is possible to use respective values of the output signal from the above-indicated sensor, as true or proper vehicle ground-speeds, without subjecting those values to any processing operations. However, the output signal from the vehicle ground-speed sensor may largely be deviated. Thus, those proper vehicle ground-speed values may be inaccurate.

SUMMARY OF THE INVENTION

It is therefore an object of the present invention to provide a vehicle ground-speed detecting apparatus which detects a ground-speed of a vehicle with improved accuracy.

The above object has been achieved by the present invention, which provides a vehicle ground-speed detecting apparatus, comprising a vehicle ground-speed sensor for detecting a ground-speed of a vehicle that is a speed of the vehicle relative to a road surface on which the vehicle is running, and generating an output signal representative of the detected vehicle ground-speed, and proper vehicle ground-speed determining means for obtaining as sampling vehicle ground-speeds successive values of the vehicle ground-speed represented by the output signal from the vehicle ground-speed sensor, and determining a current one of the sampling vehicle ground-speeds as a current proper vehicle ground-speed when the current sampling vehicle ground-speed falls within a current permission range based on a current estimated vehicle ground-speed, the proper vehicle ground-speed determining means determining the current proper vehicle ground-speed by correcting the current sampling vehicle ground-speed when the current sampling vehicle ground-speed does not fall within the current permission range.

In the vehicle ground-speed detecting apparatus constructed as described above, the proper vehicle ground-speed determining means does not determine, as a proper vehicle ground-speed, every sampling vehicle ground-speed obtained as the output signal from the vehicle ground-speed sensor. When a current sampling vehicle ground-speed falls within a current permission range based on a current estimated vehicle ground-speed, the current sampling vehicle ground-speed is determined as a current proper vehicle ground-speed. However, when the current sampling vehicle ground-speed does not fall within the current permission range, the proper vehicle ground-speed determining means determines the current proper vehicle ground-speed by correcting the current sampling vehicle ground-speed. Thus, the proper vehicle ground-speed determining means reduces or absorbs the deviations of the output signal from the vehicle ground-speed sensor. Consequently, the present apparatus provides proper vehicle ground-speed values free of excessively large deviations. Even though the output signal from the vehicle ground-speed sensor may largely be deviated, the present apparatus provides proper vehicle ground-speed values with improved accuracy, by correcting the deviations of those ground-speed values. The current estimated vehicle ground-speed may be selected from (a) the last sampling vehicle ground-speed preceding the current sampling vehicle ground-speed, (b) the last proper vehicle ground-speed preceding the current proper vehicle ground-speed, (c) an estimated vehicle ground-speed which is determined based on a plurality of past sampling vehicle ground-speeds as counted retrospectively from the last sampling vehicle ground-speed, and d) an estimated vehicle ground-speed which is determined based on the rotation speed of at least one wheel of the vehicle. In the event that the current estimated vehicle ground-speed is defined by the above-indicated value (c), the estimated vehicle ground-speed may be an average value of the past sampling vehicle ground-speeds as counted retrospectively from the last sampling vehicle ground-speed, assuming that the past sampling vehicle ground-speeds and the current sampling vehicle ground-speed each be obtained in the situation that the acceleration or deceleration of the vehicle can be regarded as zero. Alternatively, the estimated vehicle ground-speed may be determined depending upon the actual acceleration or deceleration value of the vehicle during the time period when those sampling vehicle ground-speeds are being obtained. In the event that the current estimated vehicle ground-speed is defined by the above-indicated value (d), the estimated vehicle ground-speed may be an average value of respective rotation speeds of the right and left drive wheels of the vehicle, or an average value of respective rotation speeds of the right and left non-drive wheels of the vehicle. Alternatively, when a brake is being applied to the vehicle, the highest one of respective rotation speeds of a plurality of wheels of the vehicle may be utilized as the estimated vehicle ground-speed. In the last case, when the deceleration of the highest wheel speed has exceeded a predetermined upper limit, the estimated vehicle ground-speed may be determined by assuming that the deceleration of the highest wheel speed be fixed at the predetermined upper limit. The proper vehicle ground-speed determining means may determine the current proper vehicle ground-speed by replacing the current sampling vehicle ground-speed with the last proper vehicle ground-speed, the current estimated vehicle ground-speed, or the upper or lower limit value of the current permission range.

In a preferred embodiment of the present invention, the proper vehicle ground-speed determining means comprises vehicle acceleration-deceleration determining means for determining an acceleration or deceleration value of the vehicle, and permission range determining means for determining the current permission range based on the determined vehicle acceleration or deceleration value. In this embodiment, the deviations of the output signal from the vehicle ground-speed sensor are reduced or absorbed depending upon the variation of the sampling vehicle ground-speeds caused by the variation of the actual acceleration or deceleration of the vehicle. Thus, the present apparatus determines proper vehicle ground-speeds depending upon the variation of the vehicle acceleration or deceleration, and therefore the accuracy of detection of the proper vehicle ground-speeds are increased. The actual acceleration or deceleration of the vehicle may indirectly be determined by differentiating by time the estimated vehicle ground-speeds, or may directly be measured by an acceleration-deceleration sensor. The permission range determining means may determine the current estimated vehicle ground-speed based on the vehicle acceleration or deceleration value determined and utilize the current estimated vehicle ground-speed as a reference value for the current permission range so that the permission range has a predetermined difference between an upper and a lower limit value thereof. Alternatively, assuming that the vehicle be in a constant-speed running state, the permission range determining means may determine the current estimated vehicle ground-speed as a reference value for the current permission range, so that a difference between the reference value and an upper limit value of the permission range and a difference between the reference value and a lower limit value of the permission range, each are changed depending on the vehicle acceleration or deceleration value determined.

In a further embodiment of the present invention, the proper vehicle ground-speed determining means comprises permission range determining means for determining the current permission range such that a difference between an upper and a lower limit value of the permission range is greater when accuracy of the current estimated vehicle ground-speed is low than when the accuracy of the current estimated vehicle ground-speed is high. In this embodiment, the difference between the upper and lower limit values of the current permission range, which is used for judging whether or not the current sampling vehicle ground-speed is a reliable value, is appropriately determined depending upon the degree of accuracy of the current estimated vehicle ground-speed. Thus, the accuracy of detection of the proper vehicle ground-speeds are further improved. In the event that the current estimated vehicle ground-speed is determined based on a plurality of past sampling vehicle ground-speeds as counted retrospectively from the last sampling vehicle ground-speed, the accuracy of the current estimated vehicle ground-speed may be identified as being high when the sum of the deviations of those past sampling vehicle ground-speeds from the corresponding proper vehicle ground-speeds is small; whereas the accuracy of the current estimated vehicle ground-speed may be identified as being low when the sum is large. Alternatively, when a brake is being applied to the vehicle, it is possible that the highest one of respective rotation speeds of wheels of the vehicle be utilized as the current estimated vehicle ground-speed and, when the deceleration of the highest wheel speed has exceeded a predetermined upper limit, the current estimated vehicle ground-speed is determined by fixing the deceleration value of the highest wheel speed to the predetermined upper limit. In the last case, the accuracy of the current estimated vehicle ground-speed may be identified as being high when the current estimated vehicle ground-speed is not greater than the highest wheel speed and simultaneously when a difference between a first, and a second reference vehicle ground-speed is not greater than a predetermined value, the first reference vehicle ground-speed being estimated based on a plurality of past estimated vehicle ground-speeds as counted retrospectively from the last estimated vehicle ground-speed preceding the current estimated vehicle ground-speed, the second reference vehicle ground-speed being estimated based on a plurality of past sampling vehicle ground-speeds as counted retrospectively from the last sampling vehicle ground-speed preceding the current sampling vehicle ground-speed; whereas the accuracy of the current estimated vehicle ground-speed may be identified as being low when the current estimated vehicle ground-speed is not greater than the highest wheel speed and simultaneously when the difference between the first and second reference vehicle ground-speeds is greater than the predetermined value, or when the current estimated vehicle ground-speed is greater than the highest wheel speed. The first or second reference vehicle ground-speed may be defined in the same manners as the above-indicated manners (a) to (d) for determining the current estimated vehicle ground-speed. In addition, the current proper vehicle ground-speed may be determined by replacing the current sampling vehicle ground-speed with the first or second reference vehicle ground-speed.

BRIEF DESCRIPTION OF THE DRAWINGS

The above and optional objects, features and advantages of the present invention will be better understood by reading the following detailed description of the presently preferred embodiments of the invention when considered in conjunction with the accompanying drawings, in which:

FIG. 9 is a flow chart representing a different, vehicle ground-speed calculating routine implemented by the apparatus of FIG. 8.

DETAILED DESCRIPTION OF THE PREFERRED EMBODIMENTS

Figure 1:
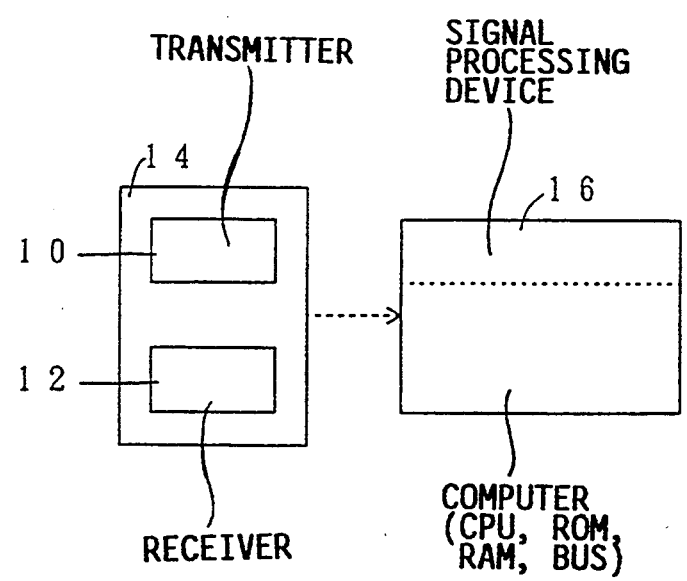
FIG. 1 is a diagrammatic view of a Doppler-effect vehicle ground-speed detecting apparatus embodying the present invention.

Referring first to FIG. 1, there is shown a vehicle ground-speed detecting apparatus embodying the present invention. The present apparatus includes an ultrasonic Doppler-effect vehicle ground-speed sensor 14.

As shown in FIG. 1, the ground-speed sensor 14 includes a transmitter 10 and a receiver 12. The present apparatus further includes a signal processing device 16 which consists essentially of a computer including a central processing unit (CPU), a read only memory (ROM), a random access memory (RAM), and a bus. The ground-speed sensor 14 is attached to the bottom surface of a vehicle (not shown) such that the transmitter and receiver 10, 12 are oriented in the forward running direction of the vehicle, so as to face the road surface at a predetermined acute angle (reference angle) relative to the road surface in a plane parallel to the vehicle running direction and perpendicular to the road surface.

Figure 2:
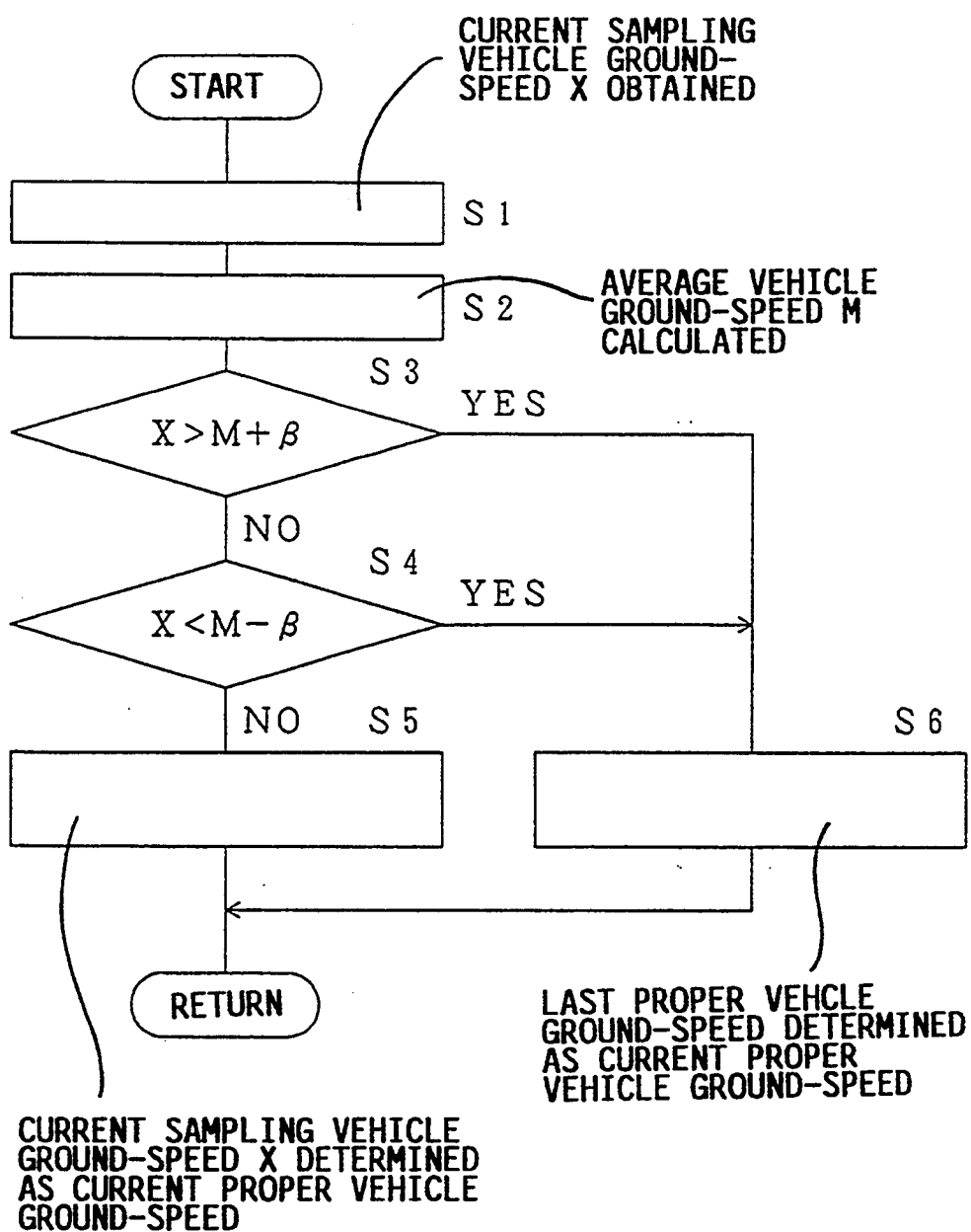
FIG. 2 is a flow chart representing a vehicle ground-speed calculating routine which is implemented by the apparatus of FIG. 1.

The transmitter 10 generates a wave in the form of an ultrasonic wave having a predetermined frequency (transmitting frequency). A portion of the ultrasonic wave incident upon the road surface and reflected therefrom is received by the receiver 12. An output signal representative of a frequency (receiving frequency) of the wave received by the receiver 12 is sent to the signal processing device or computer 16. The vehicle ground-speed calculating routine, represented by the flow chart of FIG. 2, is stored in the ROM of the computer 16. The CPU of the computer 16 periodically implements the vehicle ground-speed calculating routine.

In each of periodic cycles according to the flow chart of FIG. 2, first, the control of the CPU begins with Step S1 in which the CPU calculates a ground-speed of the vehicle, by utilizing the Doppler effect of the ultrasonic wave used, based on the transmitting and receiving frequencies of the ultrasonic wave and the reference angle of the ground-speed sensor 14 relative to the vehicle forward running direction. Hereinafter, this vehicle ground-speed is referred to as a current sampling vehicle ground-speed, X. The receiving frequency of the ultrasonic wave is represented by the output signal from the receiver 12. Step S1 is followed by Step S2 to calculate a current average ground-speed, M, that is, an average value of a plurality of past sampling vehicle ground-speeds (e.g., 20 to 50 samples stored in the RAM before the current cycle) as counted retrospectively from the last sampling vehicle ground-speed preceding the current sampling vehicle ground-speed. In the present embodiment, the current average ground-speed M serves as the current estimated vehicle ground-speed.

Subsequently, the control of the CPU goes to Step S3 to judge whether or not the current sampling ground-speed X is greater than an upper-limit value ($=M+\beta$, $\beta>0$) of a current permission range whose middle value is equal to the average ground-speed M. Provided that a negative judgement (NO) be made in Step S3, the control proceeds with Step S4 to judge whether or not the current sampling ground-speed X is smaller than a lower limit value ($=M-\beta$) of the current permission range. Provided that a negative judgement be made in Step S4, the control goes to Step S5 to determine the current sampling ground-speed X as a current proper vehicle ground-speed and store the data in the RAM. Thus, one cycle of this routine is ended.

Meanwhile, provided that the current sampling ground-speed X be greater than the upper limit value of the current permission range or be smaller than the lower limit value of the same, an affirmative judgement (YES) is made in Step S3 or Step S4. In either case, the control of the CPU goes to Step S6 to determine, as the current proper vehicle ground-speed, the last proper vehicle ground-speed determined in the last cycle prior by one cycle to the current cycle. The current proper vehicle ground-speed is stored in the RAM. That the current sampling ground-speed X does not fall within the current permission range means that the value X is excessively largely deviated from the tendency of the past sampling vehicle ground-speed values. Therefore, the computer 16 estimates that the reliability of the current sampling ground-speed X is insufficiently low. Consequently, the CPU utilizes the last proper vehicle ground-speed as the current proper vehicle ground-speed.

Even though the output signal of the vehicle ground-speed sensor 14 may largely be deviated, the present apparatus is capable of providing proper vehicle ground-speed values with high accuracy, by absorbing the deviations of those speed values.

As is apparent from the foregoing description, the signal processing device or computer 16 serves as the proper vehicle ground-speed determining means.

Proper vehicle ground-speed values falling within a sufficiently small range, may be obtained by supplying the output signal from the vehicle ground-speed sensor 14 to the signal processing device 16, not directly but via a filter (e.g., digital filter). In this case, however, the output signal from the filter would probably fail to suitably respond to actual change of the vehicle ground-speed. That is, an excessively long time lag would probably be necessary from the vehicle ground-speed change and to the output of the filter in response to the speed change. In the present embodiment, however, such filters may be omitted, or some of those filters may be omitted. Thus, the present vehicle ground-speed detecting apparatus is free of the problem of the time lag due to the filter treatment.

Figure 3:
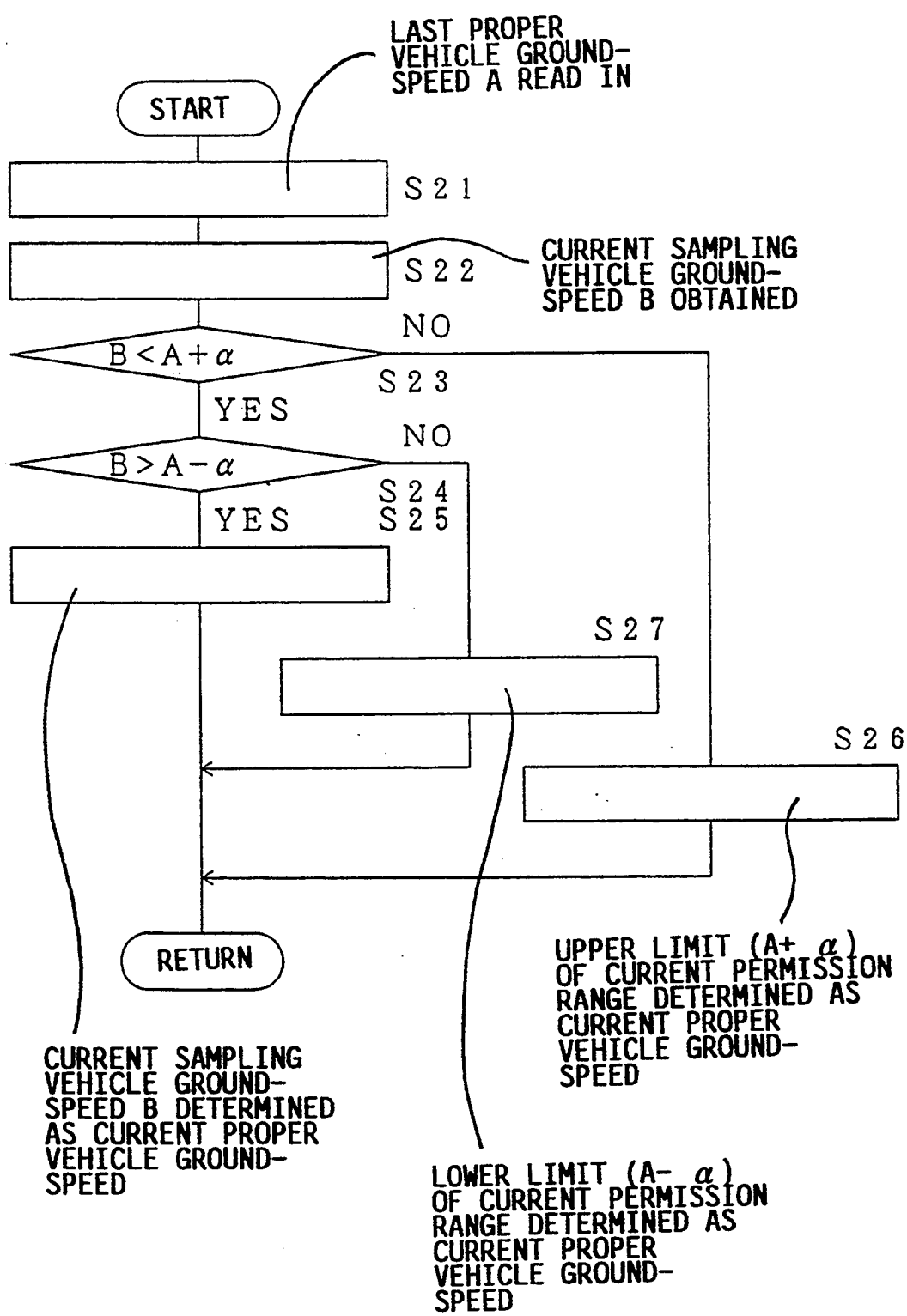
FIG. 3 is a flow chart representing a different vehicle ground-speed calculating routine employed in the second embodiment of the invention.

Referring next to FIG. 3, there is shown the flow chart representing a different vehicle ground-speed calculating routine which is implemented by the Doppler-effect vehicle ground-speed detecting apparatus of FIG. 1. In this second embodiment, too, the apparatus is adapted to periodically implement the vehicle ground-speed calculating routine.

First, in Step S21, the CPU of the signal processing device or computer 16 reads in the last proper vehicle ground-speed, A, that had been determined in the last cycle prior by one cycle to the current cycle and had been stored in the RAM. Step S21 is followed by Step S22 to calculate a current sampling vehicle ground-speed, B, based on the output signal from the vehicle ground-speed sensor 14, in the same manner as that used in Step S1 of FIG. 2. Subsequently, the control of the CPU goes to Step S23 to judge whether or not the current sampling vehicle ground-speed B is smaller than an upper limit value ($=A+\alpha$, $\alpha>0$) of a current permission range whose middle value is equal to the last proper vehicle ground-speed A. Provided that an affirmative judgement be made in Step S23, the control proceeds with Step S24 to judge whether or not the current sampling ground-speed B is greater than a lower limit value ($=A-\alpha$) of the current permission range. In those two steps, the CPU judges whether or not the current sampling ground-speed B falls within the current permission range (A±α) having the upper limit value (A+α) and the lower limit value (A−α). In the present embodiment, the last proper vehicle ground-speed A serves as the current estimated vehicle ground-speed.

The value α is a constant value. Thus, a difference between the upper or lower limit value of the current permission range and the last proper ground-speed A is by no means changed. As described previously, the present apparatus implements the routine of FIG. 3 at regular intervals of time. In addition, the highest possible acceleration and deceleration values for the vehicle, to which the present apparatus is applied, are known as, for example, about 1 G. Therefore, the value α is determined to be equal to the amount of speed change of the vehicle caused by accelerating or decelerating the vehicle at 1 G for each regular interval of time in which the routine of FIG. 3 is implemented by one time.

In the event that the current sampling ground-speed B falls within the current permission range, an affirmative result is obtained in each of Steps S23 and S24. Therefore, the control of the CPU goes to Step S25 to determine the current sampling vehicle ground-speed B as a current proper vehicle ground-speed. On the other hand, in the event that the current sampling ground-speed B is not smaller than the upper limit value of the current permission range, a negative result is obtained in Step S23, so that the control of the CPU goes to Step S26 to determine, as the current proper vehicle ground-speed, the upper limit value of the current permission range. Meanwhile, in the event that the current sampling ground-speed B is not greater than the lower limit value of the current permission range, an affirmative result is obtained in Step S23 and a negative result is obtained in Step S24, so that the control of the CPU goes to Step S27 to determine, as the current proper vehicle ground-speed, the lower limit value of the current permission range. Thus, in any event, one cycle of the routine is ended.

Figure 4:
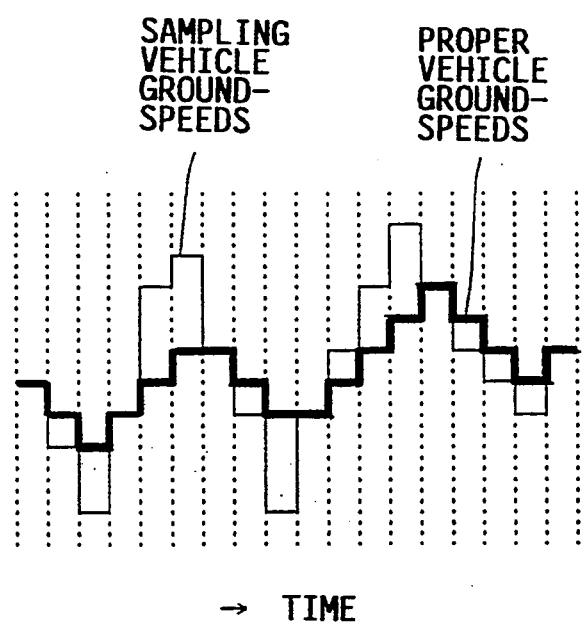
FIG. 4 is a graph for explaining the manner in which sampling vehicle ground-speed values are corrected according to the flow chart of FIG. 3.

Provided that sampling vehicle ground-speed values change with time, as shown in the graph of FIG. 4, when the vehicle runs at a constant speed, the present apparatus provides proper vehicle ground-speed values as shown in the same graph, by reducing or restricting the deviations of those values to within a smaller range. Thus, the present apparatus detects the vehicle ground-speed with increased accuracy.

As emerges from the foregoing description, in the second embodiment, too, the signal processing device or computer 16 serves as the proper vehicle ground-speed determining means.

Figure 5:
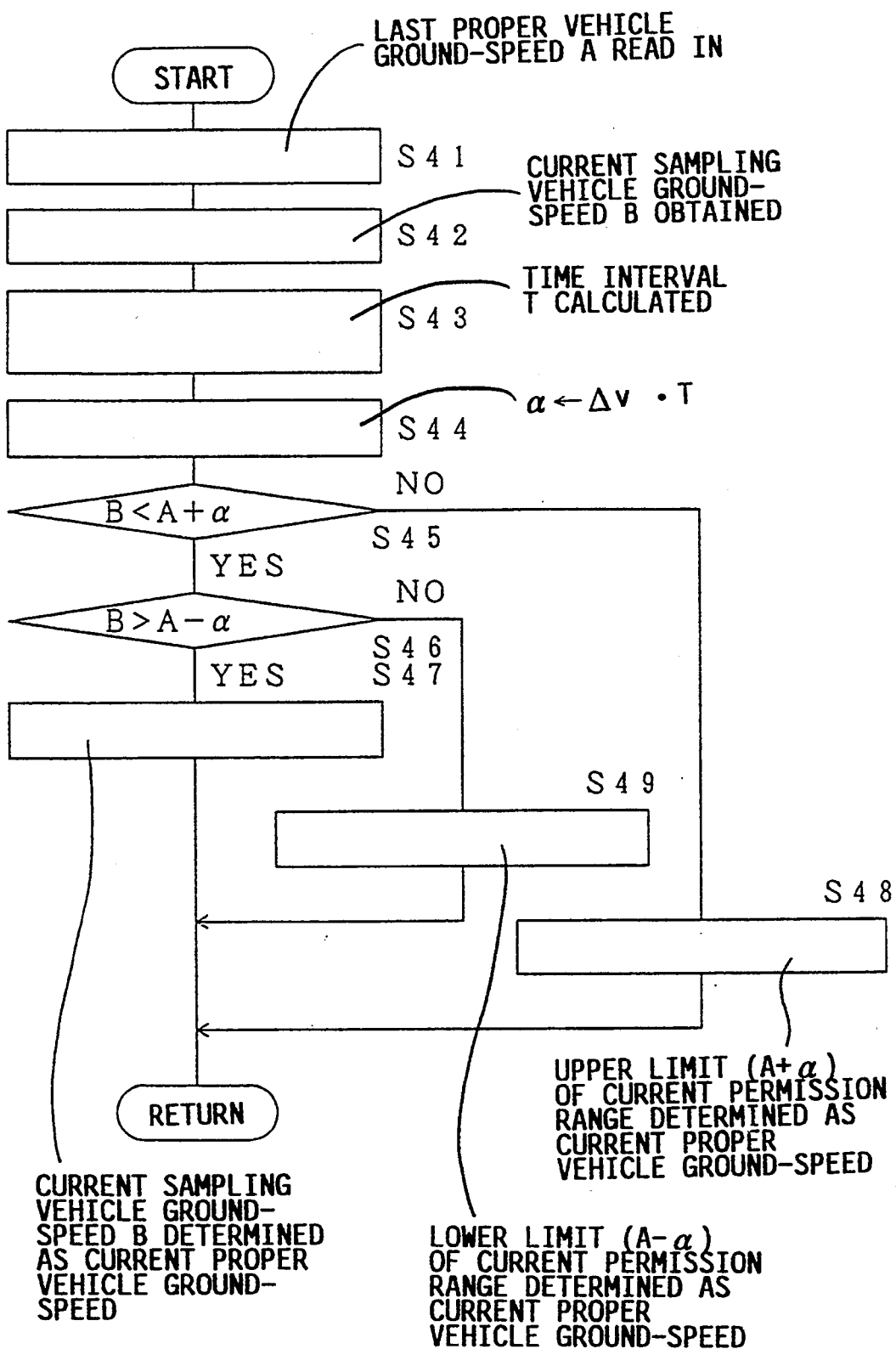
FIG. 5 is a flow chart representing a different vehicle ground-speed calculating routine employed in the third embodiment of the invention.

Referring next to FIG. 5, there is shown the flow chart representing a different vehicle ground-speed calculating routine which is implemented by the Doppler-effect vehicle ground-speed detecting apparatus of FIG. 1. In this third embodiment, the apparatus is not adapted to periodically implement the vehicle ground-speed calculating routine.

First, in Step S41, the CPU of the signal processing device or computer 16 reads in the last proper vehicle ground-speed, A, that had been determined in the last cycle prior by one cycle to the current cycle and had been stored in the RAM. Step S41 is followed by Step S42 to calculate a current sampling vehicle ground-speed, B, based on the output signal from the vehicle ground-speed sensor 14, in the same manner as that used in Step S1 of FIG. 2. Subsequently, the control of the CPU goes to Step S43 to determine a time, T, which has elapsed from the time of implementation of the last vehicle ground-speed calculation to the time of implementation of the current one. Step S43 is followed by Step S44 to calculate a value, α, which is the amount of speed change of the vehicle caused by accelerating or decelerating the vehicle at 1 G for the time T. More specifically, the value α is obtained as a product of the time T and a speed change amount per unit time, Δv, of the vehicle when the vehicle is accelerated or decelerated at 1 G. Since the vehicle ground-speed calculating routine is not periodically implemented in the third embodiment, unlike the first or second embodiment, the value α, i.e., half the difference between the upper and lower limit values of the permission range is variable in different cycles of the routine. Subsequently, Steps S45 through S48 are carried out similar to Steps S23 through S27 of FIG. 3.

As can be understood from the foregoing description, the signal processing device or computer 16 serves as the proper vehicle ground-speed determining means.

In each of the first to third embodiments, the current permission range is determined independently of the acceleration or deceleration of the vehicle.

Hereinafter, there will be described the fourth embodiment of the present invention, in which the current permission range is determined by utilizing an actual acceleration or deceleration value of the vehicle.

Figure 6:
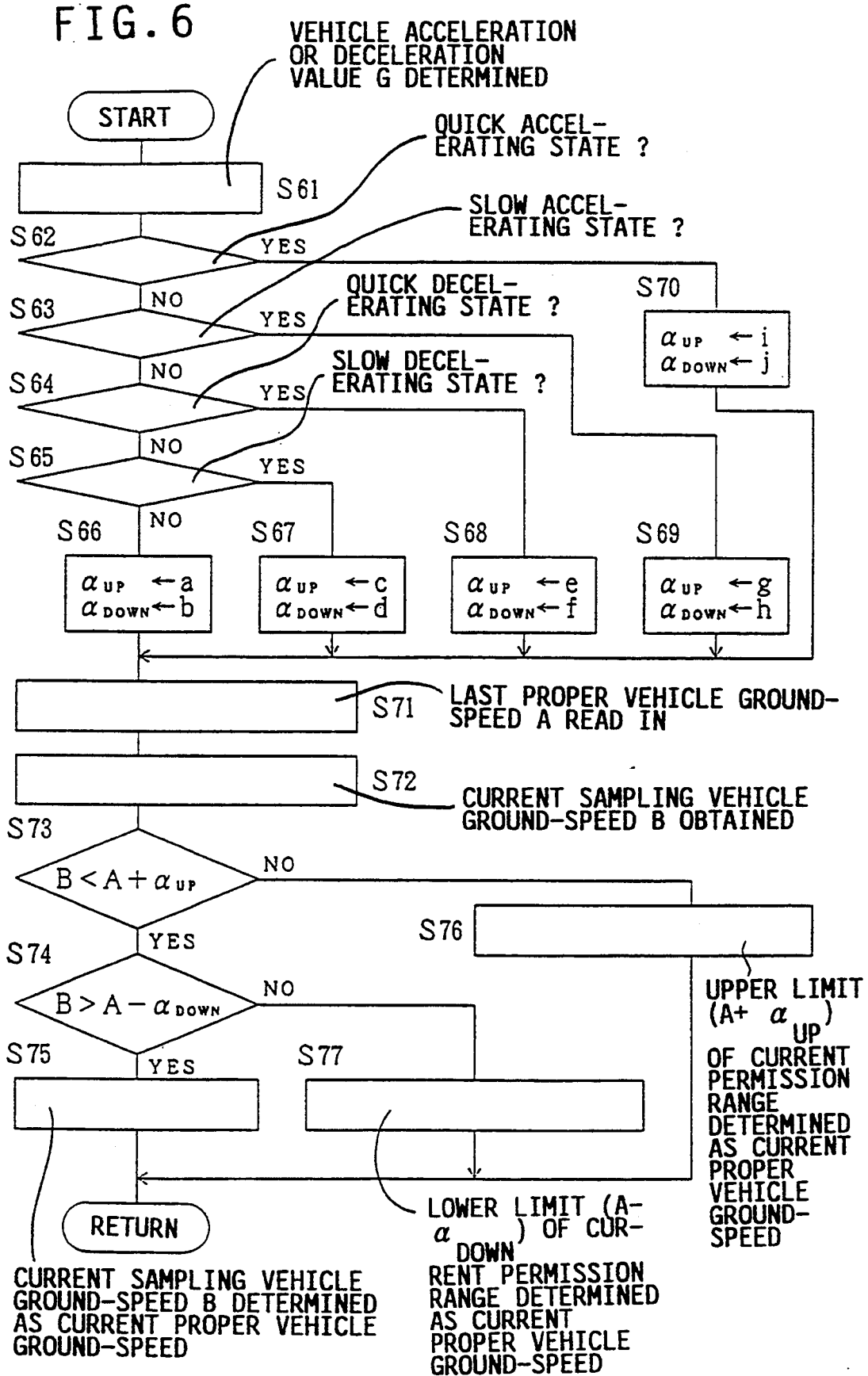
FIG. 6 is a flow chart representing a different vehicle ground-speed calculating routine employed in the fourth embodiment of the invention.

Referring to FIG. 6, there is shown the flow chart representing a different vehicle ground-speed calculating routine which is implemented by the Doppler-effect vehicle ground-speed detecting apparatus of FIG. 1. In this fourth embodiment, the apparatus is adapted to periodically implement the vehicle ground-speed calculating routine. In addition, a vehicle ground-speed estimating routine is also stored in the ROM of the computer 16, which routine is used for estimating a ground-speed of the vehicle based on respective rotation speeds of four wheels of the vehicle. i.e., determining an estimated vehicle ground-speed, and store the data in the RAM. For example, the highest one of the four wheel speeds is utilized as the estimated vehicle ground-speed.

The general characteristics of the routine of FIG. 6 will be explained below.

This routine is carried out for first obtaining an acceleration or deceleration value, G, of the vehicle and estimating in which state the vehicle is now running, that is, whether the vehicle is now running in a quick accelerating state, in a slow accelerating state, in a quick decelerating state, in a slow decelerating state, or in a steady- or constant-speed state. In this routine, the last proper vehicle ground-speed obtained in the last cycle is utilized as a reference value for the current permission range. Therefore, in the fourth embodiment, the last proper vehicle ground-speed serves as the current estimated vehicle ground-speed. A difference between the reference value and an upper limit value of the current permission range, that is, a speed increase amount, $a_{UP}$, and a difference between the reference value and a lower limit value of the current permission range, that is, a speed decrease amount, $a_{DOWN}$, are determined depending upon which state of the above-indicated five running states the vehicle is now situated in. For example, in the event that the vehicle is in the quick accelerating state, the speed increase and decrease amounts $a_{UP}$, $a_{DOWN}$ are calculated by using +1.0 G and −0.0 G, respectively; in the event that the vehicle is in the slow accelerating state, the amounts $a_{UP}$, $a_{DOWN}$ are calculated by using +0.5 G and −0.1 G, respectively; in the event that the vehicle is in the steady-speed state, the amounts $\alpha_{UP}$, $\alpha_{DOWN}$ are calculated by using +0.3 G and −0.3 G, respectively; in the event that the vehicle is in the slow decelerating state, the amounts $\alpha_{UP}$, $\alpha_{DOWN}$ are calculated by using +0.1 G and −0.5 G, respectively; and in the event that the vehicle is in the quick decelerating state, the amounts $\alpha_{UP}$, $\alpha_{DOWN}$ are calculated by using +0.0 G and −1.0 G, respectively.

After the upper and lower limit values of the current permission range are thus determined, the current proper vehicle ground-speed is determined by using the current sampling vehicle ground-speed and the last proper vehicle ground-speed.

Hereinafter, there will be described in detail the routine of FIG. 6 with respect to each step thereof.

First, in Step 61, the CPU of the computer 16 calculates an acceleration or deceleration value, G, of the vehicle based on the regular time interval, T, between periodic cycles of the routine and a difference between the current and last estimated vehicle ground-speed values each determined according to the previously described vehicle ground-speed estimating routine. A positive value G indicates that the vehicle is being accelerated, whereas a negative value G indicates that the vehicle is being decelerated.

Subsequently, in Steps S62 through S65, the CPU judges whether the vehicle is now in the quick accelerating state, in the slow accelerating state, in the quick decelerating state, in the slow decelerating state, or in the steady-speed state. In the event that the vehicle is in the steady-speed state, a negative result is obtained in each of Steps S62 to S65, so that the control of the CPU goes to Step S66 to determine a first predetermined value, $\underline{a}$, as the speed increase amount $\alpha_{UP}$ and determine a second predetermined value, $\underline{b}$, as the speed decrease amount $\alpha_{DOWN}$. In the event that the vehicle is in the slow decelerating state, in the quick decelerating state, in the slow accelerating state, or in the quick accelerating state, the control of the CPU goes to Step S67, S68, S69 or S70, respectively, to determine a third, fifth, seventh, or ninth predetermined value, $\underline{c}$, $\underline{e}$, $\underline{g}$, or $\underline{i}$, as the speed increase amount $\alpha_{UP}$, respectively, and determine a fourth, sixth, eighth, or tenth predetermined value, $\underline{d}$, $\underline{f}$, $\underline{h}$, or $\underline{j}$, as the speed decrease amount $\alpha_{DOWN}$, respectively.

Subsequently, in Step S71, the CPU of the computer 16 reads in the last proper vehicle ground-speed A from the RAM. Step S71 is followed by Step S72 to calculate a current sampling vehicle ground-speed B based on the output signal from the vehicle ground-speed sensor 14. Subsequently, the control of the CPU goes to Step S73 to judge whether or not the current sampling vehicle ground-speed B is smaller than an upper limit value of the current permission range, that is, the last proper ground-speed A plus the speed increase amount $\alpha_{UP}$. In Step S74, the CPU judges whether or not the current sampling ground-speed B is greater than a lower limit value of the current permission range, that is, the last proper ground-speed A minus the speed decrease amount $\alpha$DOWN. In the event that the current sampling vehicle ground-speed B falls within the current permission range, an affirmative judgements is made in each of Steps S73 and S74, so that the control of the CPU goes to Step S75 to determine the current sampling vehicle ground-speed B as the current proper vehicle ground-speed. On the other hand, in the event that the current sampling vehicle ground-speed B is not smaller than the upper limit value of the current permission range, a negative judgement is made in Step S73, so that the control of the CPU goes to Step S76 to determine the upper limit value ($=A+\alpha_{UP}$) of the current permission range as the current proper vehicle ground-speed. Meanwhile, in the event that the current sampling vehicle ground-speed B is not greater than the lower limit value of the current permission range, a negative judgement is made in Step S74, so that the control of the CPU goes to Step S77 to determine the lower limit value ($=A-\alpha_{DOWN}$) of the current permission range as the current proper vehicle ground-speed. Thus, one cycle of this routine is ended.

In the fourth embodiment, the last proper vehicle ground-speed is utilized as the reference value for the current permission range, and the speed increase and decrease amounts $\alpha_{UP}$, $\alpha_{DOWN}$, that is, respective differences between the reference value and the upper and lower limit values of the current permission range are so determined as to follow the actual acceleration or deceleration of the vehicle. Thus, the current permission range as a whole is so determined as to follow the actual acceleration or deceleration of the vehicle. Consequently, the present apparatus is capable of more reliably absorbing the deviation of the output signal from the vehicle ground-speed sensor 14, as compared with the first to third embodiments in which the value $\beta$, $\alpha$, or $\Delta v$ is constant. Thus, the present apparatus detects the vehicle ground-speed witch increased accuracy.

As can be understood from the foregoing description, a portion of the computer 16 which implements the vehicle ground-speed estimating routine and Step S61 of FIG. 6, serves as the vehicle acceleration or deceleration determining means; a portion of the computer 16 which implements Steps S62 through S70 serves as the permission range determining means; and a portion of the computer 16 which implements Steps S71 through S77 serves as the proper vehicle ground-speed determining means.

In the fourth embodiment, the reference value for the current permission range is determined independently of the actual acceleration or deceleration of the vehicle, and the speed increase and decrease amounts $\alpha_{UP}$, $\alpha_{DOWN}$ are so determined as to follow the actual vehicle acceleration or deceleration, so that the current permission as a whole follows the actual vehicle acceleration or deceleration. However, it is possible to determine the speed increase and decrease amounts $\alpha_{UP}$, $\alpha_{DOWN}$ independently of the actual acceleration or deceleration of the vehicle and determine the reference value for the current permission range so as to follow the actual vehicle acceleration or deceleration, so that the current permission as a whole follows the actual vehicle acceleration or deceleration. This arrangement is achieved by the fifth embodiment of the present invention described below.

Figure 7:
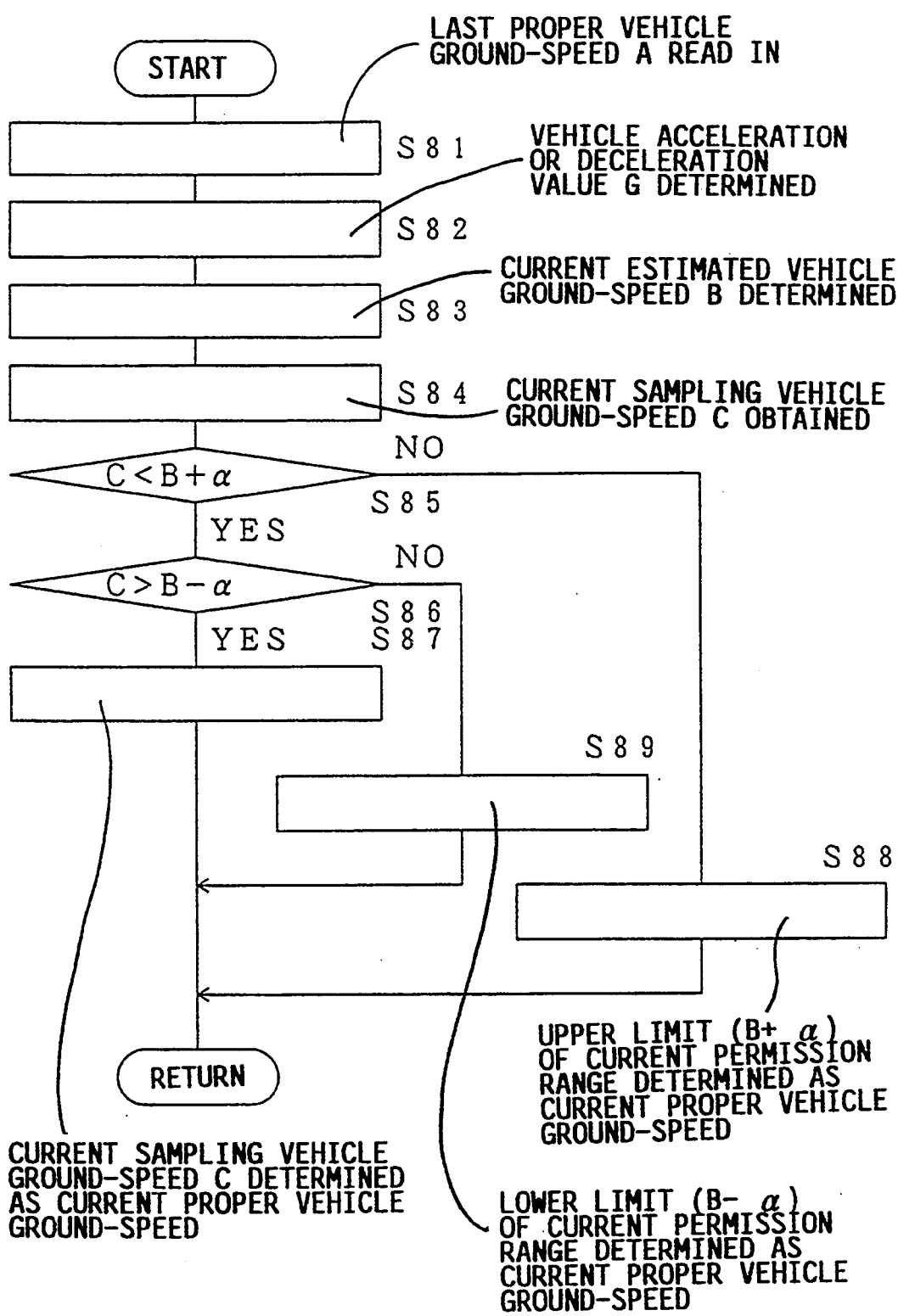
FIG. 7 is a flow chart representing a different vehicle ground-speed calculating routine employed in the fifth embodiment of the invention.

Referring to FIG. 7, there is shown the flow chart representing a different vehicle ground-speed calculating routine which is implemented by the Doppler-effect vehicle ground-speed detecting apparatus of FIG. 1. This routine is stored in the ROM of the computer 16.

In the fifth embodiment, a constant value, $\alpha$, is used in place of each of the speed increase and decrease amounts $\alpha_{UP}$, $\alpha_{DOWN}$ used in the preceding embodiment. A current estimated vehicle ground-speed is determined based on the last proper vehicle ground-speed and the actual vehicle acceleration or deceleration value. The current estimated vehicle ground-speed is utilized as the reference value for the current permission range. The current permission range is determined based on the reference value and the constant value α.

First, in Step S81, the CPU of the computer 16 reads in the last proper vehicle ground-speed A from the RAM. Step S81 is followed by Step S82 to determine an acceleration or deceleration value, G, of the vehicle in the same manner as that used in Step S61 of FIG. 6. Subsequently, the control of the CPU goes to Step S83 to calculate a current estimated vehicle ground-speed, B, based on the last proper vehicle ground-speed A and the vehicle acceleration or deceleration value G. More specifically, the current estimated vehicle ground-speed B is determined according to the following expression:

$$B = A + G \cdot \Delta t$$

where, $\Delta t$ indicates the regular time interval at which the routine is implemented periodically.

Step S83 is followed by Step S84 to obtain a current sampling vehicle ground-speed, C, based on the output signal from the vehicle ground-speed sensor 14. Subsequently, the control of the CPU goes to Step S85 to judge whether or not the current sampling vehicle ground-speed C is smaller than an upper limit value of the current permission range, that is, the current estimated vehicle ground-speed B plus the constant value α. In Step S86, the CPU judges whether or not the current sampling ground-speed C is greater than a lower limit value of the current permission range, that is, the current estimated vehicle ground-speed A minus the constant value α. In the event that the current sampling vehicle ground-speed C falls within the current permission range, an affirmative judgements is made in each of Steps S85 and S86, so that the control of the CPU goes to Step S87 to determine the current sampling vehicle ground-speed C as the current proper vehicle ground-speed.

On the other hand, in the event that the current sampling vehicle ground-speed C is not smaller than the upper limit value of the current permission range, a negative judgement is made in Step S85, so that the control of the CPU goes to Step S88 to determine the upper limit value (=B+α) of the current permission range as the current proper vehicle ground-speed. Meanwhile, in the event that the current sampling vehicle ground-speed C is not greater than the lower limit value of the current permission range, an affirmative judgement is made in Step S85 and a negative judgement is made in Step S86, so that the control of the CPU goes to Step S89 to determine the lower limit value (=B−α) of the current permission range as the current proper vehicle ground-speed.

In the fifth embodiment, the differences between the reference value and the upper and lower limit values of the current permission range are not variable in respective cycles of the routine. However, the current estimated vehicle ground-speed as the reference value is variable depending upon the vehicle acceleration or deceleration value G. Consequently, the current permission range as a whole is so determined as to follow the actual vehicle acceleration or deceleration. Thus, the accuracy of detection of the vehicle ground-speed is improved.

As is apparent from the foregoing description, a portion of the computer 16 which implements the vehicle ground-speed estimating routine and Step S82 of FIG. 7, serves as the vehicle acceleration or deceleration determining means; a portion of the computer 16 which implements Steps S81, and S83 through S86 serves as the permission range determining means; and a portion of the computer 16 which implements Steps S85 through S89 serves as the proper vehicle ground-speed determining means.

In the illustrated five embodiments, the present invention is applied to a vehicle ground-speed detecting apparatus which is of the type in which the Doppler effect of an ultrasonic wave is utilized. However, the present invention may be applied to vehicle ground-speed detecting apparatus of a different type in which the Doppler effect of a different kind of wave such as microwave or laser beam is utilized. In addition, the present invention may be applied to vehicle ground-speed detecting apparatus of the spatial-filter type in which sampling vehicle ground-speed values are obtained by using a well-known spatial filter.

Figure 8:
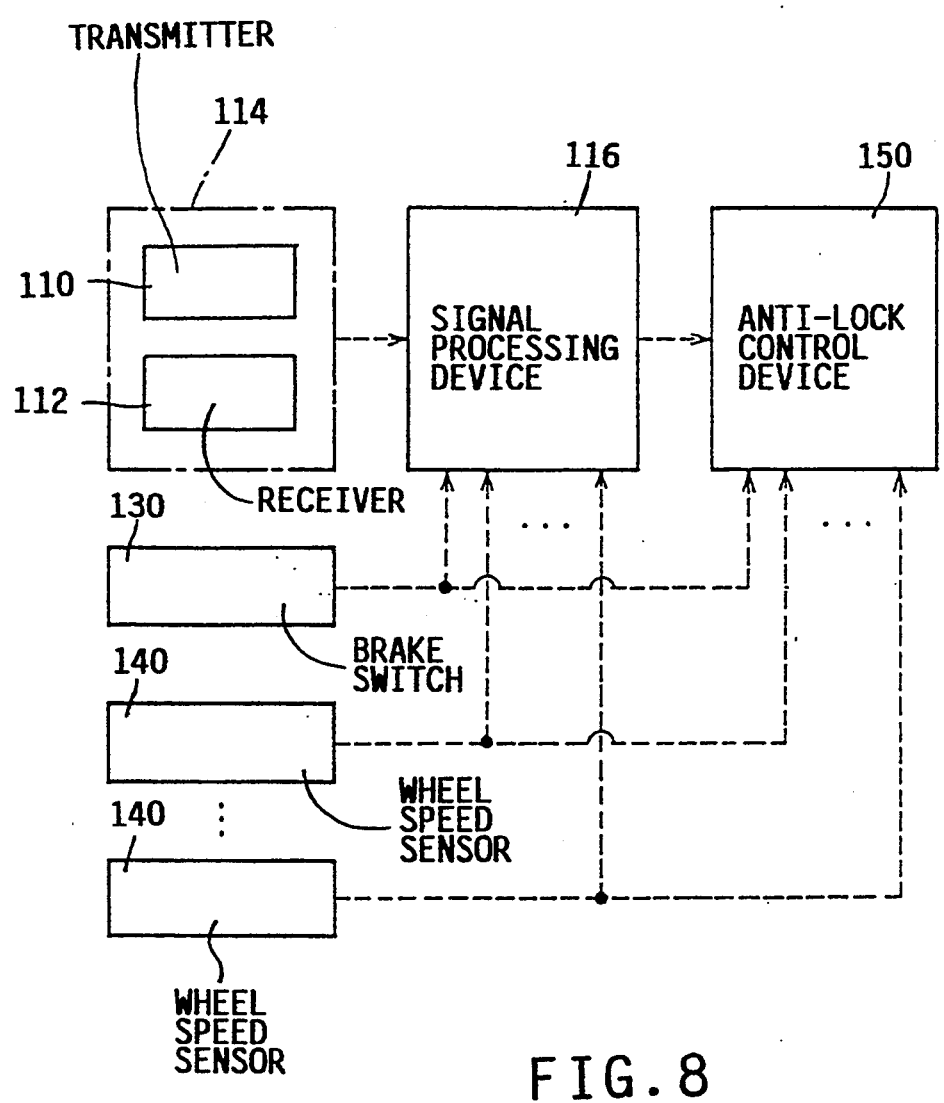
FIG. 8 is a diagrammatic view of a Doppler-effect vehicle ground-speed detecting apparatus as the sixth embodiment of the invention.

Referring next to FIG. 8, there is shown a Doppler-effect vehicle ground-speed detecting apparatus as the sixth embodiment of the present invention.

As shown in the figure, the present apparatus includes an ultrasonic Doppler-effect vehicle ground-speed sensor 114 and a signal processing device 116. The sensor 114 includes a transmitter 110 and a receiver 112. The sensor 114 is secured to the bottom surface of automotive vehicle's body to which the present apparatus is applied. The transmitter and receiver 110, 112 are oriented in the forward running direction of the vehicle, so as to face the road surface at a predetermined acute angle (reference angle) relative to the road surface in a plane parallel to the vehicle running direction and perpendicular to the road surface. The transmitter 110 generates a wave in the form of an ultrasonic wave having a predetermined frequency (transmitting frequency). A portion of the ultrasonic wave incident upon the road surface and reflected therefrom is received by the receiver 112. An output signal representative of a frequency (receiving frequency) of the wave received by the receiver 112 is sent to the signal processing device 116.

The signal processing device 116 is essentially constituted by a computer including a central processing unit (CPU), a read only memory (ROM), a random access memory (RAM), and a bus. The receiver 112 is connected to the bus of the signal processing device or computer 116. A brake switch 130, four wheel speed sensors 140, and an anti-lock control device 150 each are connected to the bus of the computer 116. When the brake switch 130 detects the depression of a brake pedal by a driver, the brake switch 130 is placed from an OFF state to an ON state. When the brake switch 130 detects the release of the brake pedal by the driver, the brake switch 130 is placed from the ON state to the OFF state. The four wheel speed sensors 140 detects respective rotation speeds, VW, of four wheels (front-right, front-left, rear-right and rear-left wheels) of the vehicle. The anti-lock control device 150 reads in an appropriate proper vehicle ground-speed, U, from the RAM of the computer 116, and estimates the slip amount of each of the wheels of the vehicle based on the proper vehicle ground-speed U. Upon application of a brake to the vehicle, the anti-lock control device 150 operates for regulating the hydraulic brake pressure applied to the wheel cylinder for each wheel so as to prevent each wheel from locking on the road surface.

The vehicle ground-speed calculating routine, represented by the flow chart of FIG. 9, is stored in the ROM of the computer 116. The CPU of the computer 116 periodically implements the vehicle ground-speed calculating routine.

In each of periodic cycles according to the flow chart of FIG. 9, first, the control of the CPU begins with Step S101 in which the CPU calculates a ground-speed of the vehicle, by utilizing the Doppler effect of the ultrasonic wave used, based on the transmitting and receiving frequencies of the ultrasonic wave and the reference angle of the ground-speed sensor 114 relative to the vehicle forward running direction. Hereinafter, this vehicle ground-speed is referred to as a current sampling vehicle ground-speed, USMP. The receiving frequency of the ultrasonic wave is represented by the output signal from the vehicle ground-speed sensor 114.

Step S101 is followed by Step S102 to judge whether or not the brake pedal is being operated by the driver, that is, the brake switch 130 is now in the ON state. Provided that no brake be being applied to the vehicle, a negative judgement is made in Step S102, so that the control of the CPU goes to Step S103 to determine the current sampling ground-speed USMP as a current proper vehicle ground-speed U. Thus, one cycle of the routine is ended.

On the other hand, provided that a brake be being applied to the vehicle, an affirmative judgement is made in Step S102, so that the control of the CPU goes to Step S104 to select the highest one, VMAX, of the respective rotation speeds VW of the four wheels represented by the output signals from the four wheel speed sensors 140. Step S104 is followed by Step S105 to determine a current estimated vehicle ground-speed, VSO, based on the four wheel speeds VW. More specifically, assuming that the highest wheel speed VMAX correspond to the current proper ground-speed U, the highest wheel speed VMAX is utilized as the current estimated vehicle ground-speed VSO. If the deceleration value of the highest wheel speed VMAX exceeds a predetermined upper limit value, then the CPU fixes the deceleration value of the highest wheel speed VMAX to the predetermined upper limit value, and determines the current estimated ground-speed VSO based on the fixed deceleration value.

Subsequently, the CPU determines the current proper vehicle ground-speed U by using the current sampling vehicle ground-speed USMP, the estimated vehicle ground-speed VSO, and the highest wheel speed VMAX. This determination is carried out on following assumptions:

The vehicle may be in a braking state in which the current estimated vehicle ground-speed VSO is greater than the highest wheel speed VMAX, or in a different braking state in which the current estimated vehicle ground-speed VSO is not greater than the highest wheel speed VMAX. Therefore, it is first assumed that the slip amount of the wheel having the highest wheel speed VMAX be greater in the former braking state than in the latter braking state and accordingly that the accuracy of the current estimated proper vehicle ground-speed VSO is lower in the former braking state than in the latter braking state. Meanwhile, a larger difference between the upper and lower limit values of the current permission range indicates a lower degree of reliability of the current proper vehicle ground-speed U. Therefore, in the former braking state, a difference, $\beta$, between an upper and a lower limit value of the current permission range is determined to be a first predetermined value, $\beta_1$, while in the latter braking state the difference $\beta$ of the current permission range is determined to be a second predetermined value, $\beta_2$, smaller than the first difference $\beta_1$.

The above-indicated former braking state will be referred to as "the first braking state". In the event that the vehicle is in the above-indicated latter braking state in which the current estimated vehicle ground-speed VSO is not greater than the highest wheel speed VMAX, the vehicle may be in one of a second braking state in which a difference between an average value, VSOM, of a plurality of past estimated vehicle ground-speed values VSO as counted retrospectively from the last estimated vehicle ground-speed, and an average value, USMPM, of a plurality of past sampling vehicle ground-speed values USMP as counted retrospectively from the last sampling vehicle ground-speed, is not greater than a first predetermined value, $\gamma_1$, a third braking state in which the difference between the two average values VSOM, USMPM is greater than the first predetermined value $\gamma_1$ and simultaneously is not greater than a second predetermined value $\gamma_2$ greater than the first predetermined value $\gamma_1$, and a fourth braking state in which the difference between the two average values VSOM, USMPM is greater than the second predetermined value $\gamma_2$. When the vehicle is in the second braking state, the accuracy of the current estimated vehicle ground-speed VSO is high, and therefore the current permission range is determined to have the second difference $\beta_2$ between the upper and lower limit values thereof. However, when the vehicle is in the third braking state, the accuracy of the current estimated vehicle ground-speed VSO is low, like when in the first braking state, and therefore the current permission range is determined to have the first difference $\beta_1$ between the upper and lower limit values thereof. Meanwhile, when the vehicle is in the fourth braking state, the current sampling vehicle ground-speed USMP is determined as the current proper vehicle ground-speed U.

When the vehicle is in the second or third braking state, it can be assumed that the current estimated vehicle ground-speed VSO correspond to the current proper vehicle ground-speed U, and that any differences between the estimated vehicle ground-speeds VSO and the sampling vehicle ground-speeds USMP be mainly due to the deviation of the output signal of the vehicle ground-speed sensor 114, that is, detection errors of the sampling vehicle ground-speeds USMP. Therefore, the current permission range is determined to have the larger difference $\beta_1$ when the vehicle is in the third braking state, than the difference $\beta_2$ of the current permission range when the vehicle is in the second braking state. On the other hand, when the vehicle is in the fourth braking state, it can be assumed that the current estimated vehicle ground-speed VSO be excessively largely deviated from the current proper vehicle ground-speed U, and that any differences between the estimated vehicle ground-speeds VSO and the sampling vehicle ground-speeds USMP be mainly due to the errors of the estimated vehicle ground-speeds VSO. Therefore, the current sampling vehicle ground-speed USMP is used as the current proper vehicle ground-speed U.

Back to the flow chart of FIG. 9, Step S105 is followed by Step S106 to judge whether or not the current estimated vehicle ground-speed VSO is greater than the highest wheel speed VMAX. Provided that the current estimated vehicle ground-speed VSO be greater than the highest wheel speed VMAX, an affirmative judgement is made in Step S106, so that the control goes to Step S107 to determine the current permission range to have the larger difference $\beta_1$ between the upper and lower limit values thereof. On the other hand, provided that the current estimated vehicle ground-speed VSO be not greater than the highest wheel speed VMAX, a negative judgement is made in Step S106, so that the control goes to Step S108 to judge whether or not the difference between the above-indicated two average values VSOM, USMPM is greater than the first predetermined value $\gamma_1$. Provided that a negative judgement be made in Step S108 (that is, the vehicle be in the second braking state), the control goes to Step S109 to determine the current permission range to have the smaller difference $\beta_2$ between the upper and lower limit values thereof. On the other hand, provided that an affirmative judgement be made in Step S108, the control goes to Step S110 to judge whether or not the difference between the two average values VSOM, USMPM is greater than the second predetermined value $\gamma_2$. Provided that a negative judgement be made in Step S110 (that is, the vehicle be in the third braking state), the control goes to Step S107 to determine the current permission range to have the larger difference $\beta_1$ between the upper and lower limit values thereof. On the other hand, provided that an affirmative judgement be made in Step S110 (that is, the vehicle be in the fourth braking state), the control goes to Step S111 to determine the current sampling vehicle ground-speed USMP as the current proper vehicle ground-speed U, and store the data in the RAM.

It is noted that the relationship between the current estimated vehicle ground-speed VSO and the highest wheel speed VMAX or the relationship between the difference of the two average values VSOM, USMPM and the first or second predetermined value $\gamma_1$, $\gamma_2$ may change during the period of a brake application. For example, each relationship may change as a result of operation of the anti-lock control device 150.

With implementation of Step S111, one cycle of this routine is ended. However, in the event that Step S107 or Step S109 is carried out, the control of the CPU subsequently goes to Step S112 to judge whether or not the current sampling vehicle ground-speed USMP is greater than an upper limit value of the current permission range, that is, the current estimated vehicle ground-speed VSO plus the first or second predetermined value $\beta_1$ or $\beta_2$. Provided that a negative judgement be made in Step S112, the control of the CPU goes to Step S113 to judges whether or not the current sampling ground-speed USMP is smaller than a lower limit value of the current permission range, that is, the current estimated vehicle ground-speed VSO minus the first or second predetermined value $\beta_1$ or $\beta_2$. Provided that a negative judgement be made in Step S113, the control of the CPU goes to Step S114 to determine the current sampling vehicle ground-speed USMP as the current proper vehicle ground-speed U, and store the data in the RAM. Thus, one cycle of this routine is ended.

On the other hand, in the event that the current sampling vehicle ground-speed USMP is greater than the upper limit value of the current permission range, or smaller than the lower limit value of the same, an affirmative judgement is made in Step S112 or Step S113, so that the control of the CPU goes to Step S115 to determine the last proper vehicle ground-speed U as the current proper vehicle ground-speed U and store the data in the RAM. In this way, one cycle of the routine is ended.

As can be understood from the foregoing description, the difference $\beta$ between the upper and lower limit values of the current permission range, which is used for judging whether or not the current sampling vehicle ground-speed USMP is a reliable value, is suitably changed depending upon the degree of accuracy of the current estimated vehicle ground-speed VSO. Thus, the accuracy of detection of the proper vehicle ground-speeds is improved.

As previously described, when a negative judgement is made in Step S102, that is, when no brake is being applied to the vehicle, the current sampling vehicle ground-speed USMP is determined as the current proper vehicle ground-speed, in Step S103. However, it is possible to provide, between Steps S102 and S103, an additional step to judge whether or not the current sampling vehicle ground-speed USMP falls within a current permission range whose middle value is equal to a current estimated vehicle ground-speed which is determined based on a plurality of past sampling vehicle ground-speeds USMP as counted retrospectively from the last sampling vehicle ground-speed. An average value of the past sampling vehicle ground-speeds USMP may be used as the current estimated vehicle ground-speed. In this case, when the current sampling vehicle ground-speed USMP falls within the current permission range, the current sampling vehicle ground-speed USMP is determined as the current proper vehicle ground-speed U. Meanwhile, when the current sampling vehicle ground-speed USMP does not fall within the current permission range, the current sampling vehicle ground-speed USMP is corrected for determining the current proper vehicle ground-speed U. The correction of the current sampling vehicle ground-speed USMP may be affected by replacing the current sampling vehicle ground-speed USMP with the last proper vehicle ground-speed U, the above-indicated average value of the past sampling vehicle ground-speeds USMP, or the upper or lower limit value of the current permission range.

While the present invention has been described in detail in its preferred embodiments, it is to be understood that the present invention may be modified with various changes, improvements and modifications that may occur to those skilled in the art without departing from the scope and spirit of the invention defined in the appended claims.

What is claimed is:

1. A vehicle ground-speed detecting apparatus, comprising:

a vehicle ground-speed sensor for detecting a ground-speed of a vehicle that is a speed of said vehicle relative to a road surface on which said vehicle is running, and generating an output signal representative of the detected vehicle ground-speed, said vehicle ground-speed sensor being mounted on said vehicle facing said road surface to obtain information from the road surface, and generating said output signal based on the information obtained from the road surface; and proper vehicle ground-speed determining means for obtaining as sampling vehicle ground-speeds successive values of the vehicle ground-speed represented by said output signal from said vehicle ground-speed sensor, and determining a current one of said sampling vehicle ground-speeds as a current proper vehicle ground-speed when said current sampling vehicle ground-speed falls within a current permission speed range based on a current estimated vehicle ground-speed, said proper vehicle ground-speed determining means determining said current proper vehicle ground-speed by correcting said current sampling vehicle ground-speed when said current sampling vehicle ground-speed does not fall within said current permission speed range.

2. The vehicle ground-speed detecting apparatus according to claim 1, wherein said vehicle ground-speed sensor comprises:
   a transmitter that generates an ultrasonic wave having a predetermined frequency toward said road surface; and
   a receiver that receives the ultrasonic wave reflected from the road surface, wherein said ground-speed sensor detects said vehicle ground-speed by utilizing Doppler effect of the ultrasonic wave received by said receiver, irrespective of whether said vehicle ground-speed is different from a speed of each of a plurality of wheels of said vehicle.

3. The vehicle ground-speed detecting apparatus according to claim 1, wherein said proper vehicle ground-speed determining means determines, as said current estimated vehicle ground-speed, an average value of a plurality of said sampling vehicle ground-speeds as counted retrospectively from a last sampling vehicle ground-speed preceding said current sampling vehicle ground-speed.

4. The vehicle ground-speed detecting apparatus according to claim 1, wherein said proper vehicle ground-speed determining means determines, as said current estimated vehicle ground-speed, a last proper vehicle ground-speed preceding said current estimated vehicle ground-speed.

5. The vehicle ground-speed detecting apparatus according to claim 4, wherein said proper vehicle ground-speed determining means utilizes said current estimated vehicle ground-speed as a reference value for said current permission speed range, and determines said current permission speed range such that a difference between said reference value and an upper limit value of said current permission speed range is equal to a speed increase of said vehicle caused by accelerating said vehicle at a highest possible value for said vehicle and that a difference between said reference value and a lower limit value of said current permission speed range is equal to a speed decrease of said vehicle caused by decelerating said vehicle at a highest possible value for said vehicle.

6. The vehicle ground-speed detecting apparatus according to claim 1, wherein said proper vehicle ground-speed determining means determines said current proper vehicle ground-speed by replacing said current sampling vehicle ground-speed with a last proper vehicle ground-speed preceding said current sampling proper vehicle ground-speed, when said current sampling vehicle ground-speed does not fall within said current permission speed range.

7. The vehicle ground-speed detecting apparatus according to claim 1, wherein said proper vehicle ground-speed determining means determines an upper limit value of said current permission speed range as said current proper vehicle ground-speed, when said current sampling vehicle ground-speed is not smaller than said upper limit value, and determines a lower limit value of said current permission speed range as said current proper vehicle ground-speed, when said current sampling vehicle ground-speed is not greater than said lower limit value.

8. The vehicle ground-speed detecting apparatus according to claim 1, wherein said proper vehicle ground-speed determining means comprises:
   vehicle acceleration-deceleration determining means for determining one of an acceleration value and a deceleration value of said vehicle; and
   permission speed range determining means for determining said current permission speed range based on one of the determined vehicle acceleration value and the deceleration value.

9. The vehicle ground-speed detecting apparatus according to claim 8, wherein said vehicle acceleration-deceleration determining means determines one of said vehicle acceleration value and said deceleration value by differentiating by time a speed of said vehicle estimated based on respective rotation speeds of a plurality of wheels of said vehicle.

10. The vehicle ground-speed detecting apparatus according to claim 8, wherein said permission speed range determining means determines, as said current estimated vehicle ground-speed, a last proper vehicle ground-speed preceding said current proper vehicle ground-speed, utilizes said current estimated vehicle ground-speed as a reference value for said current permission speed range, and determines said current permission speed range by changing a difference between said reference value and an upper limit value of said current permission speed range and a difference between said reference value and a lower limit value of said current permission speed range, based on one of said vehicle acceleration value and said deceleration value determined by said vehicle acceleration-deceleration determining means.

11. The vehicle ground-speed detecting apparatus according to claim 8, wherein said permission speed range determining means determines said current estimated vehicle ground-speed based on a last proper vehicle ground-speed preceding said current proper vehicle ground-speed and of said vehicle acceleration value and said deceleration value determined by said vehicle acceleration-deceleration determining means, utilizes said current estimated vehicle ground-speed as a reference value for said current permission speed range, and determines said current permission speed range such that a difference between said reference value and an upper limit value of said current permission speed range and a difference between said reference value and a lower limit value of said current permission speed range are equal to each other and are constant.

12. The vehicle ground-speed detecting apparatus according to claim 1, wherein said proper vehicle ground-speed determining means comprises permission speed range determining means for determining said current permission speed range such that a difference between an upper and a lower limit value of said current permission speed range is greater when accuracy of said current estimated vehicle ground-speed is low than when said accuracy of said current estimated vehicle ground-speed is high.

13. The vehicle ground-speed detecting apparatus according to claim 12, wherein said proper vehicle ground-speed determining means determines, as said current estimated vehicle ground-speed, a highest one of respective rotation speeds of a plurality of wheels of said vehicle, said proper vehicle ground-speed determining means determining said current estimated vehicle ground-speed by fixing a deceleration value of the highest wheel speed at a predetermined upper limit value when said deceleration value of said highest wheel speed has exceeded said predetermined upper limit value.

14. The vehicle ground-speed detecting apparatus according to claim 13, wherein said permission speed range determining means judges that said accuracy of said current estimated vehicle ground-speed is high, when said current estimated vehicle ground-speed is not greater than said highest wheel speed and simultaneously when a difference between a first and a second reference vehicle ground-speed is not greater than a predetermined value, said first reference vehicle ground-speed being estimated based on a plurality of estimated vehicle ground-speeds as counted retrospectively from a last estimated vehicle ground-speed preceding said current estimated vehicle ground-speed, said second reference vehicle ground-speed being estimated based on a plurality of said sampling vehicle ground-speeds as counted retrospectively from a last sampling vehicle ground-speed preceding said current sampling vehicle ground-speed, said permission speed range determining means judging that said accuracy of said current estimated vehicle ground-speed is low when said current estimated vehicle ground-speed is not greater than said highest wheel speed and simultaneously when said difference between said first and second reference vehicle ground-speeds is greater than said predetermined value or when said current estimated vehicle ground-speed is greater than said highest wheel speed.

15. The vehicle ground-speed detecting apparatus according to claim 14, wherein said permission speed range determining means utilizes said current estimated vehicle ground-speed as a reference value for said current permission speed range, and judges whether said vehicle is in a first braking state in which said current estimated vehicle ground-speed is greater than said highest wheel speed, in a second braking state in which said current estimated vehicle ground-speed is not greater than said highest wheel speed and simultaneously a difference between a first average value of said plurality of estimated vehicle ground-speeds and a second average value of said plurality of said sampling vehicle ground-speeds is not greater than a first predetermined value, a third braking state in which said current estimated vehicle ground-speed is not greater than said highest wheel speed and simultaneously said difference between said first and second average values is greater than said first predetermined value and is not greater than a second predetermined value greater than said first predetermined value, or a fourth braking state in which said current estimated vehicle ground-speed is not greater than said highest wheel speed and simultaneously said difference between said first and second average values is greater than said second predetermined value, said permission speed range determining means determining that said accuracy of said current estimated vehicle ground-speed is low when said vehicle is in said first or third braking state, and thereby determining said current permission speed range to have a first difference between an upper and a lower limit value thereof, said permission speed range determining means determining that said accuracy of said current estimated vehicle ground-speed is high when said vehicle is in said second braking state, and thereby determining said current permission Speed range to have, between an upper and a lower limit value thereof, a second difference smaller than said first difference, said proper vehicle ground-speed determining means determining said current proper vehicle ground-speed by utilizing said current permission Speed range determined by said permission speed range determining means, when said vehicle is in said first, second, or third braking state, and determining said current sampling vehicle ground-speed as said current proper vehicle ground-speed when said vehicle is in said fourth braking state.

16. The vehicle ground-speed detecting apparatus according to claim 15, wherein said proper vehicle ground-speed determining means determines said current proper vehicle ground-speed by replacing said current sampling vehicle ground-speed value with a last proper vehicle ground-speed preceding said current proper vehicle ground-speed, when said current sampling vehicle ground-speed does not fall within said current permission speed range.

17. A vehicle ground-speed detecting apparatus, comprising:
a vehicle ground-speed sensor for detecting a ground-speed of a vehicle that is a speed of said vehicle relative to a road surface on which said vehicle is running, and generating an output signal representative of the detected vehicle ground-speed, said vehicle ground-speed sensor being mounted on said vehicle facing said road surface to obtain information from the road surface, and generating said output signal based on the information obtained from the road surface;
permission speed range determining means for obtaining, as sampling vehicle ground-speeds, successive values of the vehicle ground-speed represented by said output signal from said vehicle ground-speed sensor, and determining a current permission speed range based on at least one of said sampling vehicle ground-speeds; and
proper vehicle ground-speed determining means for determining a current one of said sampling vehicle ground-speeds as a current proper vehicle ground-speed when said current sampling vehicle ground-speed falls within said current permission speed range, said proper vehicle ground-speed determining means determining said current proper vehicle ground-speed by correcting said current sampling vehicle ground-speed when said current sampling vehicle ground-speed does not fall within said current permission speed range.

18. The vehicle ground-speed detecting apparatus according to claim 17, wherein said permission speed range determining means comprises:
means for estimating a current vehicle ground-speed based on said at least one of said sampling vehicle ground-speeds, thereby providing a current estimated vehicle ground-speed; and
means for determining said current permission speed range based on said current estimated vehicle ground-speed.

19. A vehicle ground-speed detecting apparatus, comprising:
a vehicle ground-speed sensor for detecting a ground-speed of a vehicle that is a speed of said vehicle relative to a road surface on which said vehicle is running, and generating an output signal representative of the detected vehicle ground-speed, said vehicle ground-speed sensor being mounted on said vehicle facing said road surface to obtain information from the road surface, and generating said output signal based on the information obtained from the road surface;

vehicle ground-speed estimating means for estimating a current vehicle ground-speed based on a rotation speed of at least one wheel of said vehicle, thereby providing a current estimated vehicle ground-speed;

permission speed range determining means for determining a current permission speed range based on said current estimated vehicle ground-speed; and proper vehicle ground-speed determining means for obtaining, as sampling vehicle ground-speeds, successive values of the vehicle ground-speed represented by said output signal from said vehicle ground-speed sensor, and determining a current one of said sampling vehicle ground-speeds as a current proper vehicle ground-speed when said current sampling vehicle ground-speed falls within said current permission speed range, said proper vehicle ground-speed determining means determining said current proper vehicle ground-speed by correcting said current sampling vehicle ground-speed when said current sampling vehicle ground-speed does not fall within said current permission speed range.

20. The vehicle ground-speed detecting apparatus according to claim 19, further comprising accuracy identifying means for identifying whether accuracy of said current estimated vehicle ground-speed is high, said permission speed range determining means determining said current permission speed range based on said current estimated vehicle ground-speed, such that a difference between an upper and a lower limit value of said current permission speed range is greater when the accuracy of said current estimated vehicle ground-speed is identified to be low, than when the accuracy of said current estimated vehicle ground-speed is identified to be high.

21. The vehicle ground-speed detecting apparatus according to claim 20, wherein said accuracy identifying means identifies whether the accuracy of said current estimated vehicle ground-speed is high, based on at least one of (a) at least one estimated vehicle ground-speed provided by said vehicle ground-speed estimating means and (b) at least one sampling vehicle ground-speed obtained by said proper vehicle ground-speed determining means.

22. The vehicle ground-speed detecting apparatus according to claim 20, wherein said vehicle ground-speed estimating means normally determines, as said current estimated vehicle ground-speed, a highest one of respective rotation speeds of a plurality of wheels of said vehicle, said vehicle ground-speed estimating means determining said current estimated vehicle ground-speed by fixing a deceleration value of the highest wheel speed at a predetermined upper limit value when said deceleration value of said highest wheel speed has exceeded said predetermined upper limit value.

23. The vehicle ground-speed detecting apparatus according to claim 22, wherein said accuracy identifying means identifies that the accuracy of said current estimated vehicle ground-speed is low when said current estimated vehicle ground-speed is greater than said highest wheel speed.

* * * * *